Dec. 13, 1960
R. E. HAMSON
2,964,597
LOUDSPEAKER MAGNETIC FIELD STRUCTURE
Filed Dec. 10, 1954
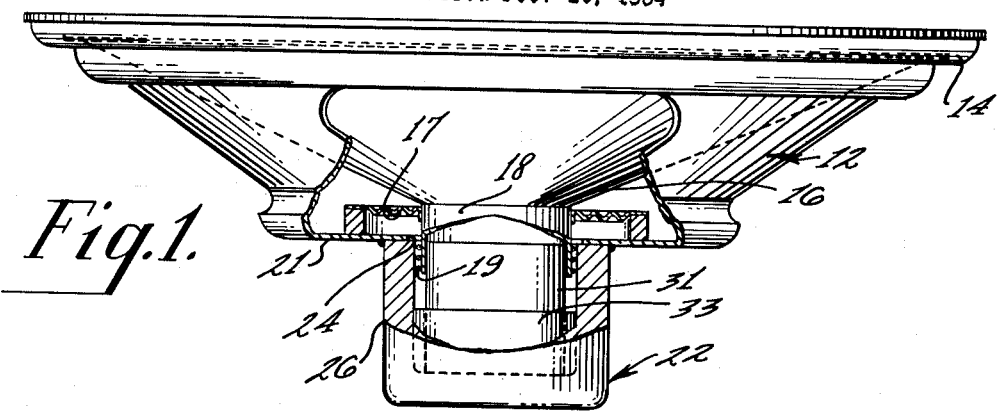
Fig.1.
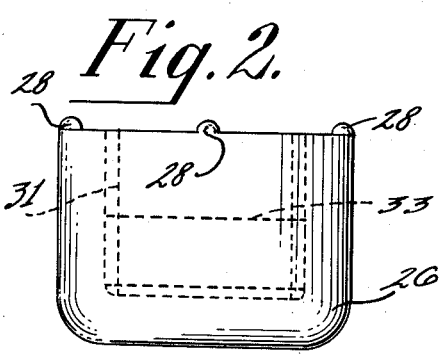
Fig.2.
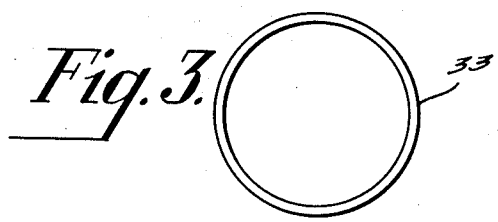
Fig.3.
Fig.4.
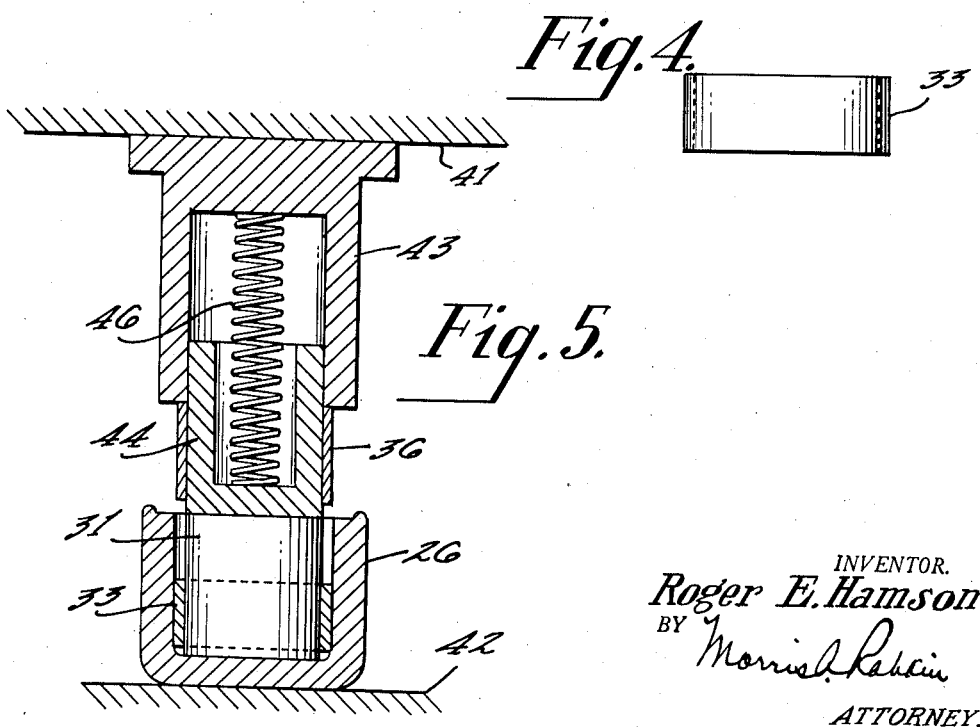
Fig.5.
INVENTOR.
Roger E. Hamson
BY
ATTORNEY.

United States Patent Office 2,964,597
Patented Dec. 13, 1960

2,964,597

LOUDSPEAKER MAGNETIC FIELD STRUCTURE

Roger E. Hamson, Barrington, N.J., assignor to Radio Corporation of America, a corporation of Delaware Filed Dec. 10, 1954, Ser. No. 474,472

5 Claims. (Cl. 179—115.5)

The present invention relates to loudspeaker magnetic field structures, and more particularly, although not necessarily exclusively, to a novel magnetic field structure including a specially mounted permanent magnet. The invention also contemplates the provision of a loudspeaker of novel form incorporating the magnetic field structure of this invention.

A magnetic field structure embodying the present invention comprises a cup-shaped magnetic member and a permanent magnet secured and centered therein in a novel manner whereby to provide an air gap for a moving coil. Yoke plates, centering rings, and other devices commonly used in loudspeaker magnetic field structures are unnecessary for use with a field structure constructed in accordance with the teachings of this invention. The parts of the illustrative embodiment to be described herein by way of example may be readily assembled so that they are disposed in accurate relationship, and this assembly of accurately positioned parts is readily combined with a loudspeaker diaphragm and its support.

Briefly, the illustrative embodiment, later to be described in more detail, comprises a cup-shaped magnetic member, referred to hereinafter for convenience of description as a "cup," and a permanent magnet substantially coaxial with the cup. The permanent magnet is secured in the cup by a deformable ring which is forced to expand radially to a major degree and beyond the elastic limit of the ring upon application of an axial force in a manner to be described. These parts constitute a field structure which abuts and is secured in a suitable manner, as by welding, to a loudspeaker frame. The neck of a diaphragm bearing a voice coil is located within the cup and surrounds the magnet. The outer rim of the diaphragm is secured in the usual manner dictated by acoustic response considerations to the loudspeaker frame.

The principal aim of the present invention is to provide a novel magnetic field structure having provision for ready connection to a loudspeaker frame.

Another object is to provide a simplified loudspeaker magnetic field structure which may be readily assembled with the parts disposed in accurate relationship.

A further object is to provide a loudspeaker magnetic field structure composed of two magnetic members which are to be assembled by a simple press operation.

Other objects and advantages of the present invention will, of course, become apparent and immediately suggest themselves to those skilled in the art to which the invention is directed from a reading of the following specification in connection with the accompanying drawing in which:

Fig. 1 is a view in elevation and partially in section of a loudspeaker embodying the present invention;

Fig. 2 is a view in side elevation to an enlarged scale of the magnetic field structure of Fig. 1;

Figs. 3 and 4 are views in top plan and side elevation, respectively, of the centering and securing ring of this invention; and Fig. 5 is a diagrammatic showing in sectional elevation of an arrangement suitable for assembly of the parts shown in Fig. 2 of the drawing.

The loudspeaker of Fig. 1, which is illustrative of the present invention, comprises a frame 12 having a rim 14 of more or less usual configuration to which is secured the outer end of the diaphragm 16. The diaphragm is shown as being in the form of a cone, but it may be of any other configuration to be adapted to an acoustic coupler such, for example, as a horn. The diaphragm is provided with a cylindrical neck portion 18 which carries the usual voice coil 19. A guide 17 of corrugated treated paper, or the like, serves as a flexible guide for the neck 18 of the diaphragm. The frame 12 has a flat rear face 21 against which the magnetic field structure, designated in its entirety by reference character 22, is secured. The face 21 of the frame is apertured as indicated at 24 to receive the neck 18 of the cone 16.

The magnetic field structure 22 (Fig. 2) comprises a cup 26. This cup is made of magnetic material and is preferably made of a pure grade of iron. It may be formed in any known manner to the illustrated cup shape and it is provided with a plurality of circumferentially spaced protuberances 28. The latter are available for facilitating the welding of the open end of the cup member against and to the flat rear face 21 of the loudspeaker frame 12. A permanent magnet 31 is nested within the cup 26. The recess within the cup 26 and the permanent magnet are shown as being circular in cross section, however, it will be understood that the present invention is not limited to a circular type of field structure. The magnet 31 is preferably made of "Alnico V" the composition of which is substantially aluminum 8%, nickel 14%, cobalt 24%, copper 3% and the remainder iron. The permanent magnet 31 is usually a casting and is or may be ground to the desired diameter. Reference character 33 designates a ring (Figs. 3 and 4) which is made of a deformable material such as aluminum, brass, copper, or solder.

The ring 33 has an outside diameter very slightly less than the inside diameter of the recess in the cup 26 and an inside diameter which is slightly greater than the outside diameter of the magnet 31. The ring 33 is placed within the recess in the cup and the magnet 31 is nested within the ring. Force is applied axially of this assembly so as to force the metal of the ring 33 to flow (i.e., expand beyond its elastic limit) whereupon its outer periphery expands and its inner periphery, in effect, contracts firmly to secure the magnet 31 within the recess of the cup. Following this operation, the magnet is tightly and substantially permanently held by the deformed ring 33. Also, the deformed ring 33 is tightly and substantially permanently secured within the recess of the cup 26. A hardened steel ring 36 (Fig. 5), which may be regarded as a gauge, having a sliding fit within the recess of the cup and being slidable over the magnet 31 is preferably employed to deform the ring 33. During this operation the ring 36 not only serves as a forming tool for the ring 33 but it also insures that the magnet 31 remains coaxial with the cup.

Fig. 5 of the drawing indicates, diagrammatically, apparatus including the previously mentioned ring or gauge 36 which may be employed to assemble the magnet 31 within the recess of the cup 26. The upper platen 41 of any suitable press (not shown) has connected thereto a tool comprising nested parts 43 and 44. The cup 26 rests or is secured on the lower platen 42 of the press. The part 44 slides within the recess of the part 43 and is spring biased outwardly by means of a compression spring 46. The part 44 is in the form of a plunger and engages the face of the magnet 31 seated within the cup 26 and surrounded by the ring 33. The spring 46 urges the plunger part 44 against the upper face of the magnet 31 to prevent displacement thereof during distortion of the ring 33. The previously mentioned ring 36 is slidably fitted over the plunger 44 and abuts the part 43 so that when the press operates the ring 36 will slide downwardly over the magnet 31 to exert the necessary distorting force on the ring 33. It will be understood that other and more elaborate arrangements may be used for deforming the ring 33.

Solely by way of example and not in a limiting sense the magnet of the illustrative embodiment has a diameter of .5575 inch. The inside diameter of the cup is .617 inch. The ring 33 before deformation has an outside diameter of .611 inch and an inside diameter of .562 inch. As stated above these figures are given solely by way of example of the illustrative embodiment of the invention and are given without reference to the usual tolerance figures.

What is claimed is:

1. A loudspeaker comprising a frame member having a front opening, a diaphragm secured in said front opening, said diaphragm having a neck portion carrying a voice coil, said frame member having an apertured portion opposite said front opening, said neck portion extending through the aperture in said apertured portion, a magnetic field structure comprising a cup-shaped magnetic member and a permanent magnet seated and secured within said cup-shaped member to project within said neck portion, said cup-shaped member having a substantially straight wall extending to the open end thereof, and a plurality of protuberances spaced circumferentially from each other on said open end, said cup-shaped member being connected by a weld at said protuberances on open end to said apertured portion of said frame member.

2. A loudspeaker comprising a frame member having a front opening, a diaphragm secured in said front opening, said diaphragm having a neck portion carrying a voice coil, said frame member having an apertured portion opposite said front opening, said neck portion extending through said aperture in the apertured portion, a magnetic field structure comprising a cup-shaped magnetic member and a permanent magnet, a retaining member for centering and securing said permanent magnet within said cup-shaped member, said retaining member having a single wall, opposite sides of said wall being radially expanded beyond its elastic limit into engagement with said magnet and said cup-shaped member, said permanent magnet projecting within said neck portion, and said cup-shaped member being connected by a weld at its open end to said apertured portion of said frame member.

3. A magnetic field structure comprising a magnetic member being cup-shaped to provide a recess for receiving a permanent magnet, a permanent magnet seated within said recess, and a retaining member surrounding said permanent magnet, said retaining member being a solid member plastically deformed while solid to produce plastic flow and tightly to surround said magnet and tightly to engage the interior of said recess.

4. A magnetic field structure comprising a magnetic member being cup-shaped to provide a recess having a circular interior wall for receiving a permanent magnet, a permanent magnet being circular in cross-section seated within said recess, and a solid retaining ring surrounding said permanent magnet, said retaining ring having been deformed in volumetric shape to a substantial degree in its solid state tightly to surround said magnet and tightly to engage the interior of said recess whereby to position said retained magnet coaxially of said circular interior wall of said cup-shaped magnetic member.

5. A magnetic field structure comprising a magnetic member, said member being cup shaped to provide a recess for receiving a permanent magnet, said cup having a cylindrical inner surface, a permanent magnet having a cylindrical outer surface seated within said recess, said cylindrical surface of said cup and said cylindrical surface of said magnet defining a cylindrical gap therebetween, and a cylindrical retaining member disposed in said gap, said retaining member having, at opposite surfaces thereof, a single wall permanently deformed beyond its elastic limit into tight engagement with both of said cylindrical surfaces.

References Cited in the file of this patent

UNITED STATES PATENTS

| 1,886,816 | Jensen | Nov. 8, 1932 |
| 1,936,918 | Seabert | Nov. 28, 1933 |
| 1,941,476 | Jensen | Jan. 2, 1934 |
| 1,941,477 | Jensen | Jan. 2, 1934 |
| 2,020,211 | Quam | Nov. 5, 1935 |
| 2,020,212 | Quam | Nov. 5, 1935 |
| 2,046,515 | Jensen | July 7, 1936 |
| 2,501,032 | Harbaugh | Mar. 21, 1950 |
| 2,517,727 | Smith | Aug. 8, 1950 |
| 2,533,498 | Munson | Dec. 12, 1950 |
| 2,551,447 | Marquis | May 1, 1951 |
| 2,769,942 | Hassan | Nov. 6, 1956 |

FOREIGN PATENTS

| 719,188 | Great Britain | Nov. 24, 1954 |